Aug. 13, 1929. M. W. WUESTHOFF 1,724,161
SHOWER BATH FIXTURE
Original Filed Jan. 31, 1928

INVENTOR.
Maximillian W. Wuesthoff
BY
Townsend, Loftus & Abbott
ATTORNEYS.

Patented Aug. 13, 1929.

1,724,161

UNITED STATES PATENT OFFICE.

MAXIMILLIAN W. WUESTHOFF, OF LOS ANGELES, CALIFORNIA.

SHOWER-BATH FIXTURE.

Application filed January 31, 1928, Serial No. 250,771. Renewed May 1, 1929.

This invention relates to shower bath fixtures, and has for its object to provide a shower bath fixture in which all exposed parts are made of porcelain or other ceramic material, and in which the shower-head proper is capable of angular adjustment on its support. Such an adjustable shower-head requires threaded pipes and a ball-and-socket joint, which must be made of metal, and it is a considerable problem to completely conceal these metallic parts and still permit the shower head to be angularly adjusted.

In the accompanying drawing, I show two forms of my invention, in which

Figure 1:
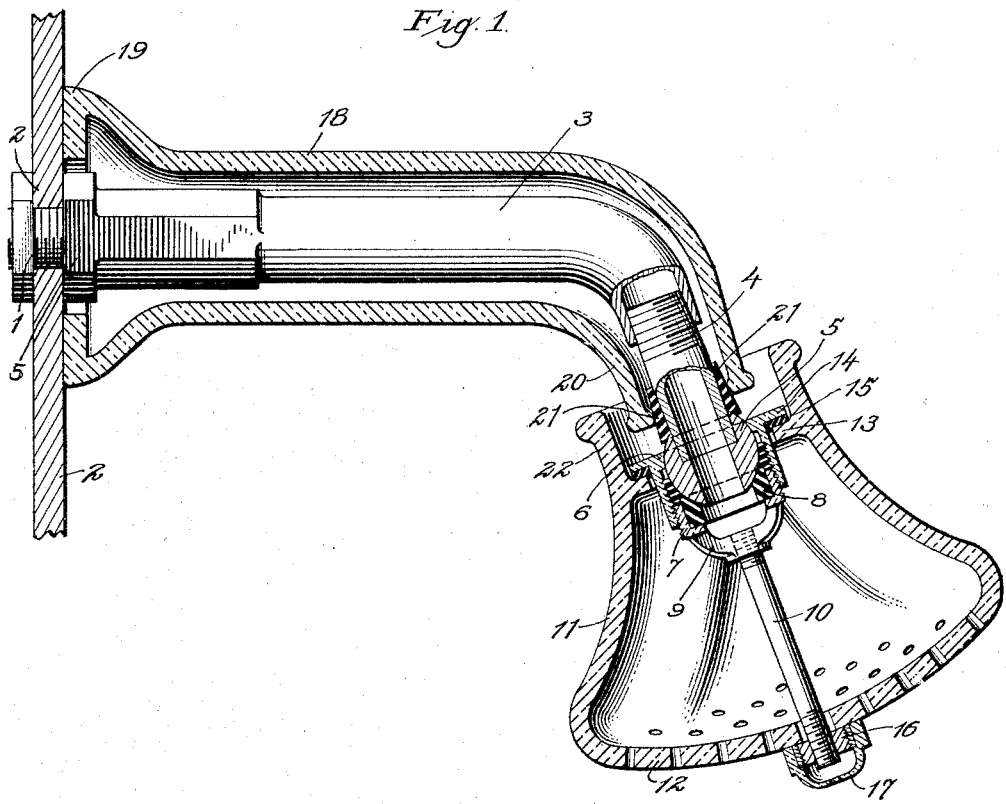
Fig. 1 is a longitudinal sectional view of an elbow fixture.

Referring in detail to Fig. 1, I show a supply pipe 1 projecting through a wall or partition 2, said pipe having a threaded end to receive a pipe section 3. The latter is shown with an elbow at its outer end and is threaded to receive a nipple 4. The nipple 4 carries at its outer end a hollow ball 5 forming part of a ball-and-socket joint. Surrounding the ball is a socket member 6 frictionally engaging the ball at one end. The other end of the socket member 6 is threaded internally to receive a second socket member 7 which carries a gasket or packing member 8 to engage the ball and to form a water-tight seal therewith. The socket member 7 carries a spider 9 at its outer end, forming an anchor for a bolt 10 by means of which the shower-head proper is held in place on the ball-and-socket joint.

The shower-head is of porcelain or china, and is made in one piece, comprising a body 11 and a perforated base 12. It is carried on the ball-and-socket joint by means of an elbow 13 co-operating with a flange 14 on the socket member 6, there being a gasket or packing member 15 between the said flange and lip for the purpose of effecting a water-tight seal. The lip on the shower-head is pressed against the gasket 15 by means of the bolt 10, which extends through the base of the shower-head and is fitted with a nut 16 at its outer end. This nut is preferably covered by a porcelain cap 17.

The pipe section 3 is concealed by a porcelain housing 18 having an enlarged end 19 abutting against the wall and terminating at its outer end in an elbow portion 20 fitting against a gasket or packing member 21 surrounding the nipple 4. The porcelain shower-head has a shroud portion 22 extending above the lip 13 and surrounding and spaced some distance from the end of the housing member 18, sufficient space being left to permit the head to be angularly adjusted within the limits allowed by the ball-and-socket joint. This shroud portion preferably overlaps the outer end of the housing 18, so as to conceal any metallic parts intermediate the head and the housing 18.

In assembling the parts, the housing 18 is first slipped over the pipe section 3. Thereafter the nipple 4, with the packing member 21, ball 5 and socket member 6 assembled thereon, is screwed into place. The packing member 21 seats against the outer end of the housing 18 and holds it tightly in place with the end 19 abutting against the wall 2. Next, the socket member 7, with the packing member 8 in place thereon, is screwed onto the socket member 6 until the ball is frictionally engaged at both sides. The shower-head with the gasket member 15 in place on the lip 13 is then arranged in place and securely clamped by means of the bolt 10 and nut 16.

Figure 2:
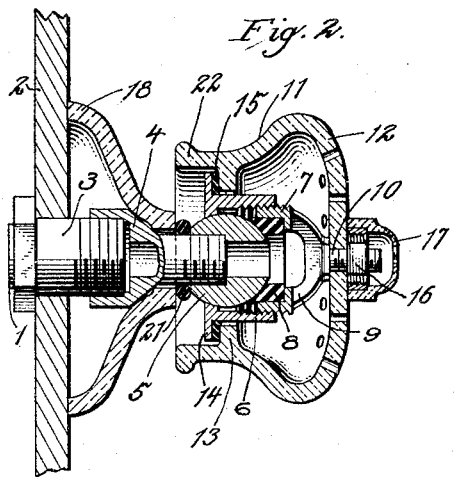
Fig. 2 is a longitudinal sectional view of a straight fixture.

In Fig. 2 similar parts, but differently shaped, are used. The principal difference is that the nipple 4 is threaded into the ball 5 and threads onto the exterior of the pipe section 3. The housing member 18 in this case is put in place after the nipple 4 is applied to the said pipe section 3. Also, the bolt 10 is shown as being integral with the spider 9. The same numerals employed in connection with Fig. 1 are used to designate corresponding parts in Fig. 2.

Various changes in the construction and arrangement of the several parts herein shown and described may be employed without departing from the spirit of my invention as disclosed in the appended claims.

Having thus described my invention, what I claim as new and desire to secure by Letters Patent is:

1. In a shower bath fixture, a metallic pipe, a joint connected thereto, which permits of angular adjustment, and formed of metallic parts, a housing of ceramic material covering said pipe, and a shower-head, also of ceramic material, carried by said adjustable joint, one of said ceramic members being formed with a shroud spaced and extended so that the metallic parts intermediate the shower-head and housing are concealed without interfering with the freedom of movement of the shower-head and adjustable joint.

2. In a shower bath fixture, a metallic pipe, a joint connected thereto which permits of angular adjustment and formed of metallic parts, a housing of ceramic material covering said pipe, and a shower-head also of ceramic material, carried by said adjustable joint and formed with a shroud spaced and extended with relation to the housing so that the metallic parts intermediate the shower head and housing are concealed without interfering with the freedom of movement of the shower head and adjustable joint.

3. In a shower bath fixture, a metallic pipe, a ball and socket joint connected thereto, said pipe and joint being formed of metallic parts, a housing of ceramic material covering said pipe, and a shower-head also of ceramic material carried by said ball and socket joint and formed with a shroud spaced and extended with relation to the housing so that the metallic parts intermediate the shower-head and housing are concealed without interfering with the freedom of movement of the shower-head and ball and socket joint.

4. In a shower bath fixture, a metallic pipe, a housing of ceramic material covering said pipe, a shower-head also formed of ceramic material, said shower-head having an annular shroud, and means for supporting said shower-head in adjustable relation with respect to said housing, with said shroud spaced and extended with relation to the housing so as to permit freedom of movement of the shower-head with relation to the housing.

MAXIMILLIAN W. WUESTHOFF.